United States Patent [19]

Terrill

[11] Patent Number: 4,820,020

[45] Date of Patent: Apr. 11, 1989

[54] PASSIVE DAYLIGHTING SYSTEM

[76] Inventor: Frank E. Terrill, Rt. 1, Box #36-A, Arlington, Kans. 67514

[21] Appl. No.: 122,928

[22] Filed: Nov. 19, 1987

[51] Int. Cl.[4] ........................ G02B 17/00; G02B 27/00

[52] U.S. Cl. ........................................ 350/259; 350/263

[58] Field of Search .................................. 350/258–264

[56] References Cited

U.S. PATENT DOCUMENTS

| | | | |
|---|---|---|---|
| 721,257 | 2/1903 | Wadsworth | 350/264 |
| 2,958,259 | 11/1960 | Ewing | 350/259 |
| 4,246,477 | 1/1981 | Latter | 350/262 X |
| 4,283,451 | 8/1981 | Abrahami | 350/259 X |
| 4,349,245 | 9/1982 | Kliman | 350/264 |
| 4,429,952 | 2/1984 | Dominguez | 350/258 |
| 4,620,771 | 11/1986 | Dominguez | 350/264 X |
| 4,699,467 | 10/1987 | Bartenbach et al. | 350/259 |

FOREIGN PATENT DOCUMENTS

| | | | |
|---|---|---|---|
| 2615379 | 10/1977 | Fed. Rep. of Germany | 350/258 |
| 441190 | 1/1968 | Switzerland | 350/263 |

*Primary Examiner*—Richard A. Wintercorn
*Attorney, Agent, or Firm*—Gregory J. Nelson

[57] ABSTRACT

A passive daylighting system having a number of reflectors arranged in vertical and horizontal arrays above a lightwell arranged to increase reflected solar insolation during certain periods in the solar day and to provide shading or blocking primarily during solar mid-day. The lightwell includes a daylighting distribution lens at its lower end. The daylighting system results in increased interior light levels with substantially reduced heat gain.

18 Claims, 5 Drawing Sheets

PASSIVE DAYLIGHTING SYSTEM

The present invention relates to a solar daylighting apparatus for illuminating the interior space of a building and more particularly relates to a passive solar daylighting system including reflectors arranged in vertical and horizontal arrays and supported above a building cavity lightwell system having a skylight and a building interior cavity lens system to diffuse and distribute daylight within the building.

Over the years, daylighting systems for commercial buildings such as offices, manufacturing plants, schools and department stores have diminished in acceptance in favor of electrical lighting systems, both incandescent and fluorescent On the other hand, electrical energy rates have continuously increased over recent years and are projected to continue to increase. The object of most effective energy cost reduction programs for commercial or institutional buildings is to reduce peak electrical energy demands occasioned by continuous use of artificial lighting systems and HVAC systems which often operate at full capacity simultaneously during daylight hours.

Many commercial and institutional buildings today are clad in reflective, tinted, heat-absorbing or filmed glass. This is done to minimize the solar heat gain which must be overcome by the air conditioning system. In an effort to partially block sunlight and the resulting heat gain to building cavities, reflective, tinted or filmed glass is used which proportionately reduces the amount of natural daylight which enters the windows. Natural light enters through such glass only when direct insolation impacts the glass surfaces. As a result of the intense heat gain shades and drapes are often required in the building interior to mask the heat and unwanted glare. Thus, even when daylight is available in sufficient quantities to offset the use of artificial lighting it often becomes necessary to utilize artificial lights in the building negating any appreciable energy cost savings that could be achieved by the installation of conventional fenestration.

It is estimated that approximately one-half the total connected electrical load in commercial buildings and retail stores is utilized for artificial lighting. Approximately one-half of the total cooling load required for these buildings is used to pump out the heat produced by such artificial lights. For example, high-efficiency fluorescent lighting sources generate approximately twice the amount of heat for the light produced as compared with an equivalent amount of daylight. The light produced by the incandescent lighting source produces approximately six times the heat as the same amount of daylight.

In view of the above and of the projected increases in electrical utility costs, daylighting techniques have become viable in conjunction with conventional interior lighting systems.

Roof-mounted unitized daylighting systems must be considered for buildings because daylighting systems are cost effective, are aesthetically pleasing and can substantially cut energy demands in buildings saving up to seventy percent of the cost of utility supplied electrical power without interfering with the comfort or productivity of the building occupants.

Commercial, institutional and industrial buildings consume energy primarily in three ways: heating, cooling and lighting. Fenestration systems, including windows, skylights and clerestories influence building energy requirements in several ways. These systems transmit solar radiant energy, provide daylight illumination and transmit heat by conduction and convection. However, fenestration in modern climate controlled buildings has usually been associated with increased heat loads due to conduction and convection and increases in cooling loads due to solar heat gain. Reports and studies such as "Evaluation of the Daylighting and Energy Performance of Windows, Skylights and Clerestories", NBSIR83-2726, published by the Department of Commerce indicate that skylights may be so effective in reducing artificial lighting energy costs that the total energy for daylighting installations, if properly designed and installed, can substantially reduce overall electrical demands nationwide.

Thus, properly engineered daylighting systems can reduce energy demands and result in substantial energy savings if properly installed. Peak demand cooling loads are less when daylighting is used than for non-daylighting systems and peak demand heating loads can remain substantially the same.

Daylighting systems also provide many tangible benefits such as improving the living and working environment for occupants. Because these systems provide low glare and full spectrum illumination they are also aesthetically pleasing.

Accordingly, there exists a need for effective daylighting systems which provide adequate illumination in building interiors, even on cloudy days or winter days, and which systems also minimize solar heat gain and simultaneously allow artificial lighting heat gain and power demand to be switched off during daytime periods.

The prior art discloses a number of daylight systems. For example, the early patent to Wadsworth, U.S. Pat. No. 721,257, shows a stationary reflecting structure arranged above a light well to direct sunlight illumination to the well in all positions of the sun and appears to disperse the solar insolation into a radiant cone thereby reducing its effectivity.

U.S. Pat. No. 4,246,477, shows an artificial and solar lighting system having a sunlight collector containing a Fresnel lens which tracks the sun during the daylight hours. Concentrated sunlight is directed through a light transmission channel to locations within the building where tubes which provide artificial lights which are automatically energized when solar levels are insufficient. The diffusion element is used for uniformly radiating both the artificial and dispersed solar light from the fixture to the building interior.

A somewhat similar system is shown in the patent to Kliman, U.S. Pat. No. 4,349,245. This patent shows a natural lighting system which utilizes a microprocessor to control a heliostatic tracking structure that is equitorially mounted on the roof of the building for collection of the sun's rays. A distributor structure is mounted below the aperture formed in the roof which receives the reflected, visible solar radiation and reflects selected portions to a plurality of reflectors mounted in the building.

U.S. Pat. No. 4,114,186 discloses a lighting fixture which includes a telescopic cylindrical light duct including a rotatable portion having a pivotally connected reflective lid. The lid is provided with a reflecting surface for reflecting sunlight through the translucent panel into the duct. The opposite end of the duct includes a diffusing panel positioned in the ceiling of the room and the duct includes an artificial light source to provide illumination when insufficient daylight is present. The lid is closed to reflect the artificial light and to prevent escape from the duct when artificial light is in use.

U.S. Pat. No. 4,429,952 relates to a skylight reflector adapted to track the daily and seasonal movements of the sun and includes a rotatively supported base which rotates about an axis substantially perpendicular to the coupled to the base for reflecting sunlight through the skylight in addition to the sunlight which strikes the skylight directly. The reflector is pivotally movable between a closed position and substantially overlying and shading the skylight in an open position for allowing sunlight to strike the skylight directly and indirectly.

While the foregoing daylighting systems and other similar systems of the prior art have met with some commercial success and in some cases served to provide interior illumination and reduced electrical energy demand, they have not achieved wide acceptance as energy cost-avoidance systems. These systems have often proved to be either too expensive to install and maintain or are of limited effect and deliver adequate illumination only during a limited number of hours, usually at midday, i.e. 10 a.m. to 2 p.m., and most are particularly ineffective during the winter season or on cloudy days. Further, these systems often result in substantial heat gain to the building interior spaces because of their inability to block or mask direct insolation at high solar altitudes.

Accordingly, it is the primary object of the present invention to provide a less expensive passive daylighting system which is substantially more effective in supplying sustained interior daylighting to building cavities with less heat gain as compared to conventional skylights.

Another object of the present invention is to provide a daylighting system which will result in substantial energy savings to end users through the controlled offsetting of electrically connected artificial lighting loads during periods of sunshine.

A further object of the present invention is to provide a passive daylighting system utilizing an array of durable, lightweight horizontal and vertical mirrors which are statically positioned over roof mounted fenestrations such as a skylight to achieve:

1. A blocking or shading effect preventing most of the direct insolation from impacting the horizontal fenestration above a predetermined solar altitude.

2. Substantially increased reflected insolation impacting the horizontal fenestration below a predetermined solar altitude.

Another object of the present invention is to provide a passive daylighting system that substantially reduces the number of roof apertures required to effectively sustain useable daylighting illumination within building cavities.

A further object of the present invention is to provide a passive daylight system having a building interior cavity lens system that diffuses and distributes daylight evenly to the building interior throughout the solar day and further substantially reduces interior light swing caused by the varying solar altitude.

Still another object of the present invention is to provide a passive daylighting system including a digital microprocessor or analog based artificial lighting controller to sense, control and regulate the artificial lighting illumination levels within the building interior.

Still another important object of the present invention is to provide a daylighting system which satisfies the basic psychological need of natural illumination for occupants of building interiors.

Briefly, in accordance with the foregoing, the present invention relates to a passive daylighting system having a group of static metallized, thin-filmed mirrors arranged in vertical and horizontal arrays and supported by a structural frame. The system is termed "passive" since it does not have any moving parts. The structural frame is positioned above a suspended light well. The light well includes a daylighting distribution lens at its lower end and a skylight sealed watertight to the roof at its upper end. The skylight has a pyramid-shaped, clear acrylic, fiberglass or poly-carbonate dome designed to admit, direct and reflected insolation into the building cavity at solar altitudes below 20°. The building interior lens system comprises an array of prismatic translucent and reflective surfaces designed to evenly distribute and diffuse daylight into building interiors. In a further embodiment of the present invention, the system also includes a commercially manufactured microprocessor/-controller designed to control artificial lighting in the building which works by bank switching on or off the artificial lighting source when the daylighting system is in use.

The above and other objects and advantages of the present invention will be more fully appreciated from the following description, claims and drawings in which:

Figure 8:
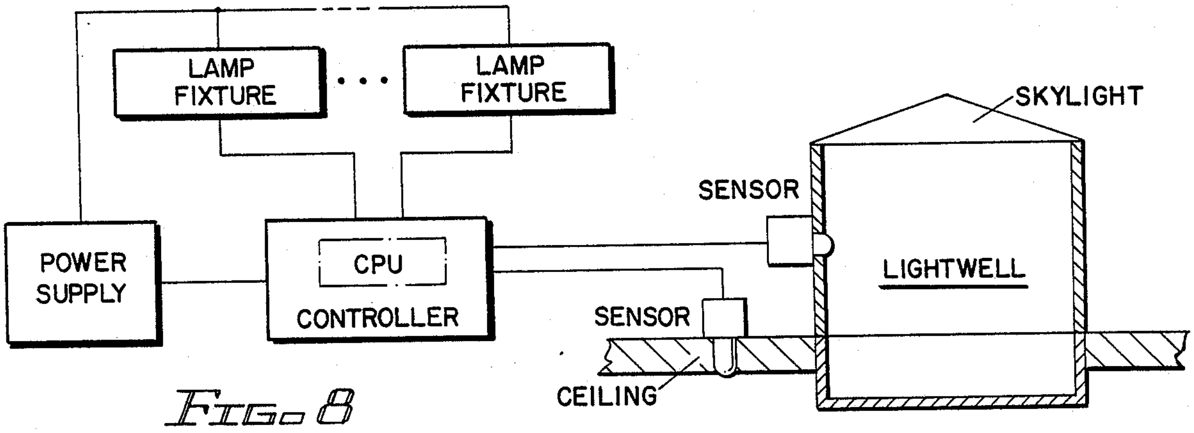
Figure 5A:
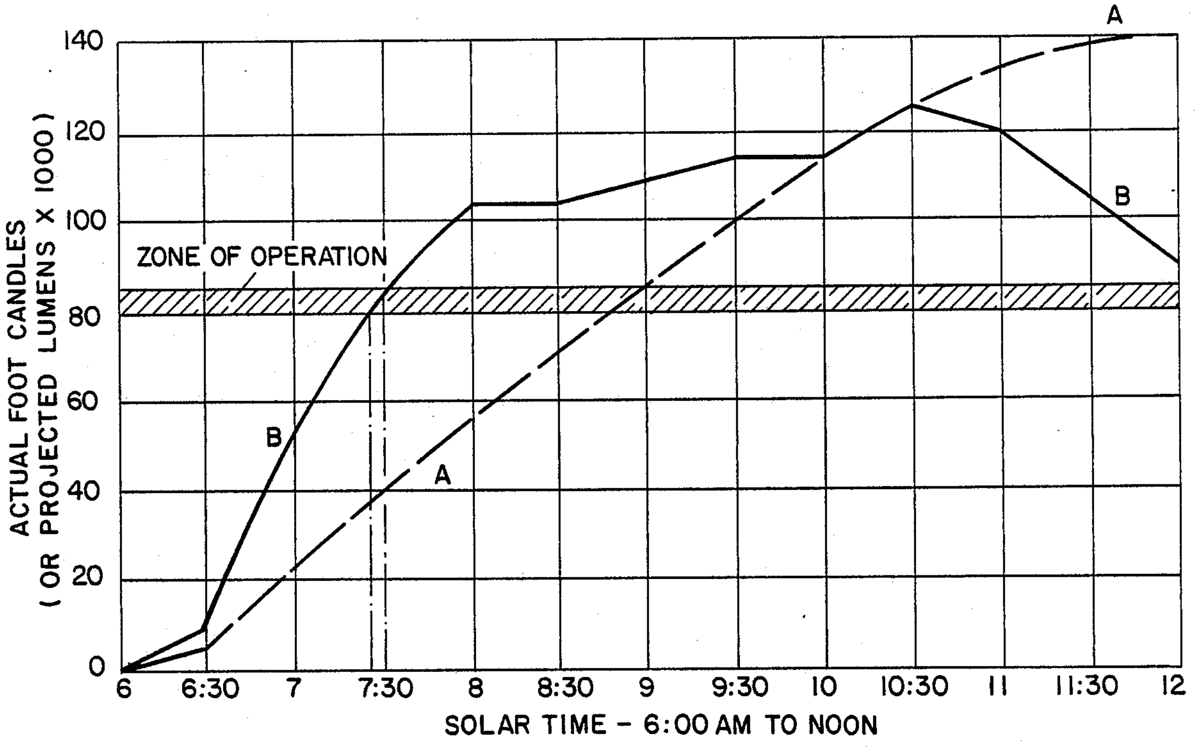
Figure 7:
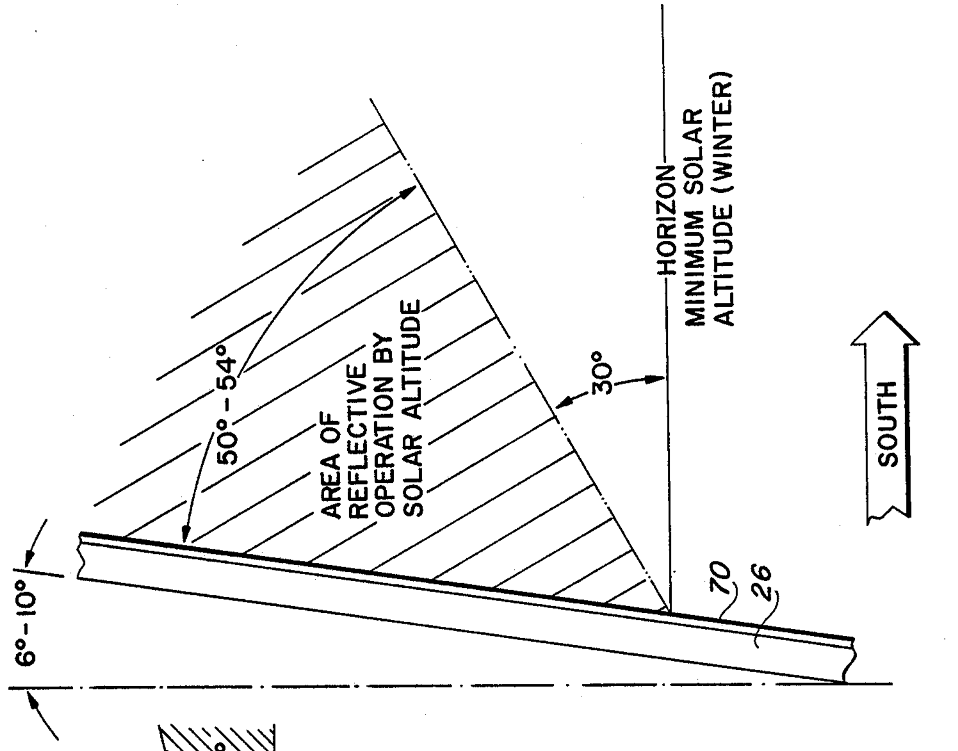
Figure 6:
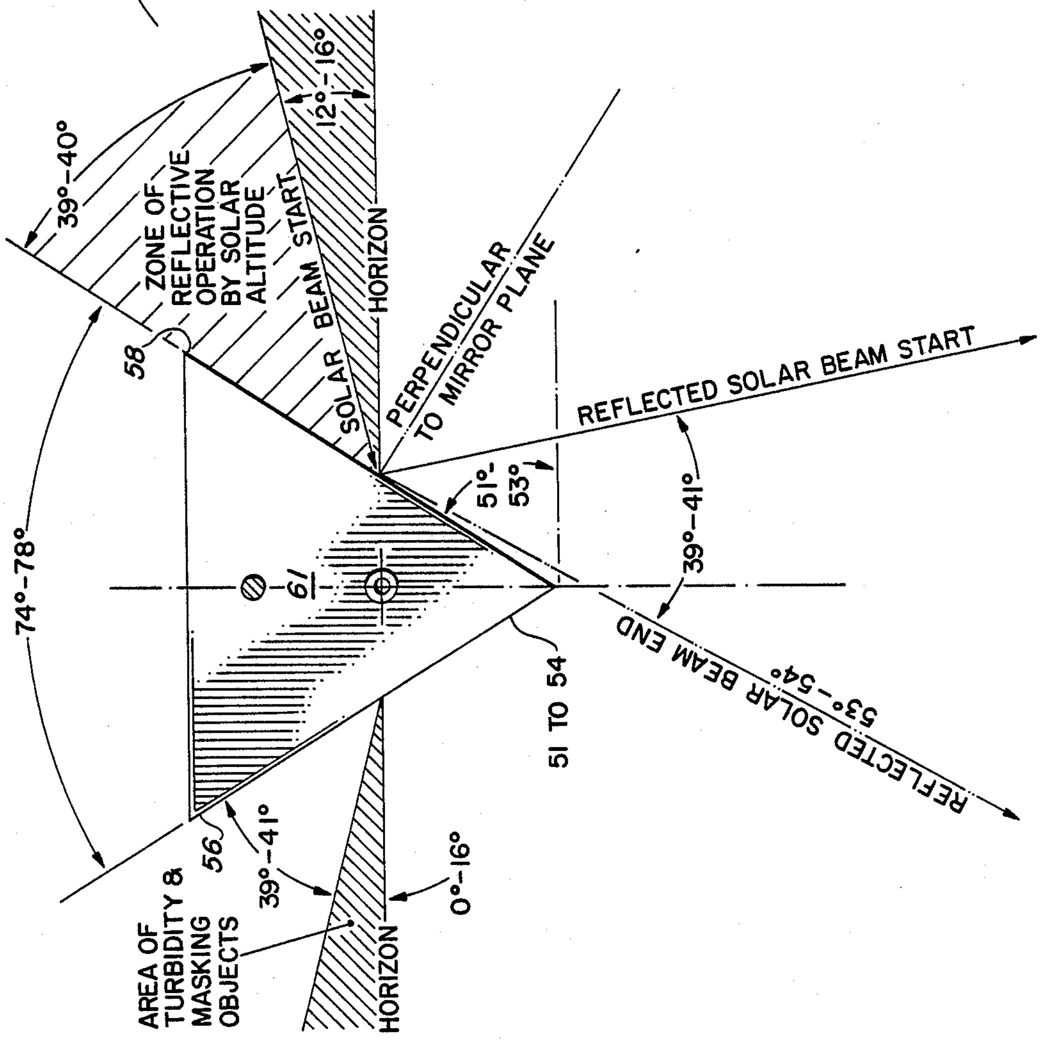

FIGS. 5A/5B are graphs illustrating the comparative performance of the daylighting system of the present invention as compared to a conventional skylight system;

FIG. 6 is an end view of a horizontal reflector unit illustrating typical reflective patterns for solar rays and the masking effect of solar insolation by the reflector;

FIG. 7 is a side view of a portion of the vertical reflector illustrating typical reflective patterns for solar rays; and FIG. 8 is a schematic diagram of the microprocessor based control system for controlling and regulating the electrically-lighted system in a building equipped with the invention.

Turning now to the drawings, the daylighting system is best seen in FIGS. 1 to 4 and is generally designated by the numeral 10 and broadly consists of a static superstructure or frame 12 which supports an array of horizontal and vertical reflectors which superstructure is positioned over a curb-mounted skylight 14 at the upper end of a light well or duct 16 and fastened to the roof surface 18. The lower end of the light well 16 is provided with a diffusion lens and daylighting distribution system 20. Superstructure 12 is shown mounted on a conventional flat roof 18 located above a space 22 within the building to be illuminated. The roof may be flat or pitched and constructed in any conventional manner having a plurality of parallel joists, rafters or beams 24 which support the roof 18 in a conventional manner. It should be noted that the roof members 24 in a conventional building construction may not have to be cut in order for the light well and daylighting system to be installed and to function properly. The structural members may remain intact if the total obstruction to insolence caused by these building members remaining in the light well does not exceed 5% of the total net horizontal plane of the light well as viewed perpendicular to the plane. It will be appreciated that the daylighting system of the present invention may be used with most any type of commercial, institutional, industrial or residential structure where single or multiple roof penetrations are structurally allowable.

Superstructure 12 includes a pair of spaced apart A-frame members 25 and 26. Member 25 includes a pair of legs 28 and 30 disposed in a generally equilateral A-configuration joined at their upper end at triangular gusset plate 32. Legs 28 and 30 are reinforced by a horizontally extending square tube frame member 34 located and secured at an intermediate location along the legs providing lateral stability to the front A-frame assembly 12.

Figure 1:
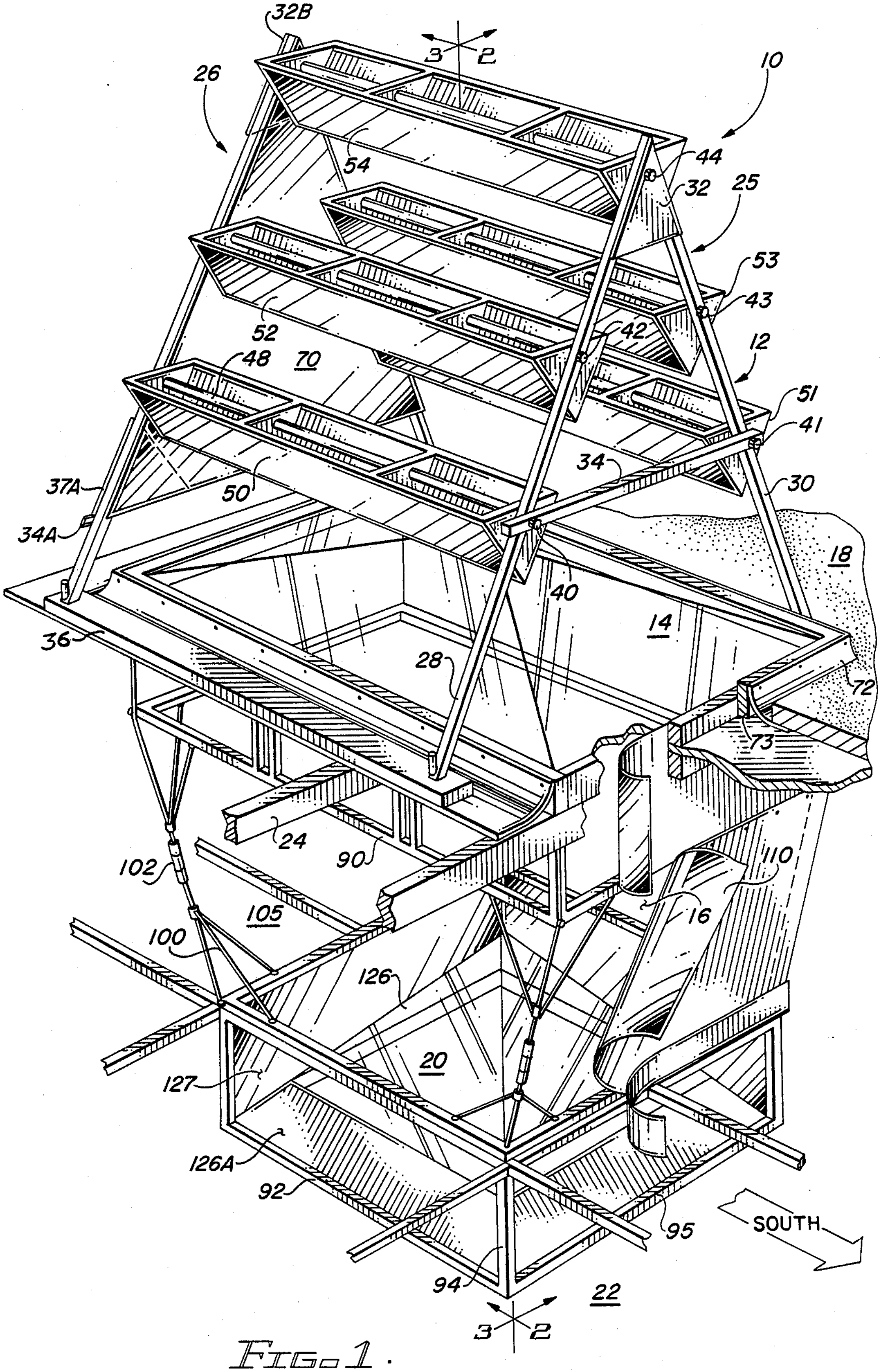
FIG. 1 is a perspective view of a roof-mounted daylighting apparatus according to the present invention.
Figure 1A:
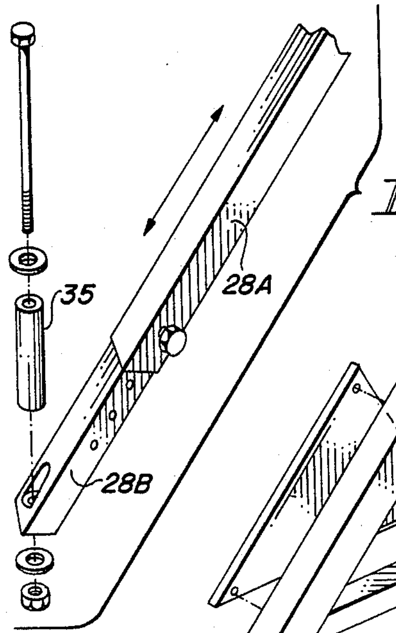
FIGS. 1A–1C are detail views of portions of the supporting frame arms which are typical.

Legs 28, 30 are fabricated from any corrosion resistant material suitable for exterior use and preferably are tubular aluminum which as seen in FIG. 1A may have a larger upper section 28A which is telescopically received over lower, smaller section 28B so that the entire frame assembly may be adjusted and secured at selected aligned holes in sections 28A and 28B. In order to precisely level the structure 12 with the horizon and the structure 12, the lower end of legs 28 and 30 are secured by fastener assembly 35 to parallel roof members 36. Members 36 are shown as 2″ ×4″'s, however, other shapes may be used. Members 36 extends transversely of the roof joists 24 being secured to the roof joists through the roof 18 to permanently attach the daylighting assembly to the building.

Figure 1C:
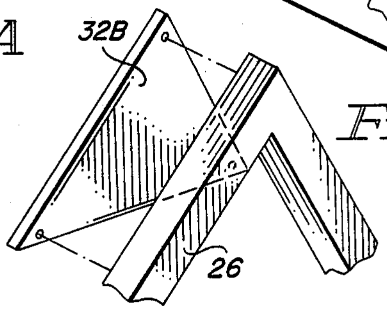
Figure 1B:
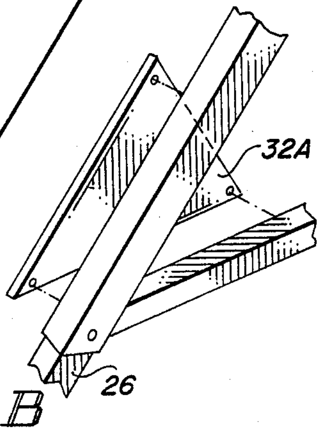

Frame 26 is constructed similar to frame member 25 and employs three gusset plates 32A and 32B as shown in FIGS. 1B and 1C and a lower lateral brace 34A that secures frame 26 against lateral movement. A-frame 26 is also secured to member 36 in the manner shown in FIG. 1A. Note that frame members 25 and 26 are generally disposed so that a line extending through the lower portions of frame members 25 and 26 extends in a north-/south direction with frame member 25 being the southern-most frame member.

Frame members 25 and 26 are secured as a rigid unit by a plurality of continuous threaded rods 40, 41, 42, 43 and 44 extending horizontally between the spaced-apart frame members. The threaded rods typically are a nominal ¼″ diameter and each extends axially within a corrosion-resistant tube 48, extending longitudinally within reflector units 50 to 55.

Figure 4:
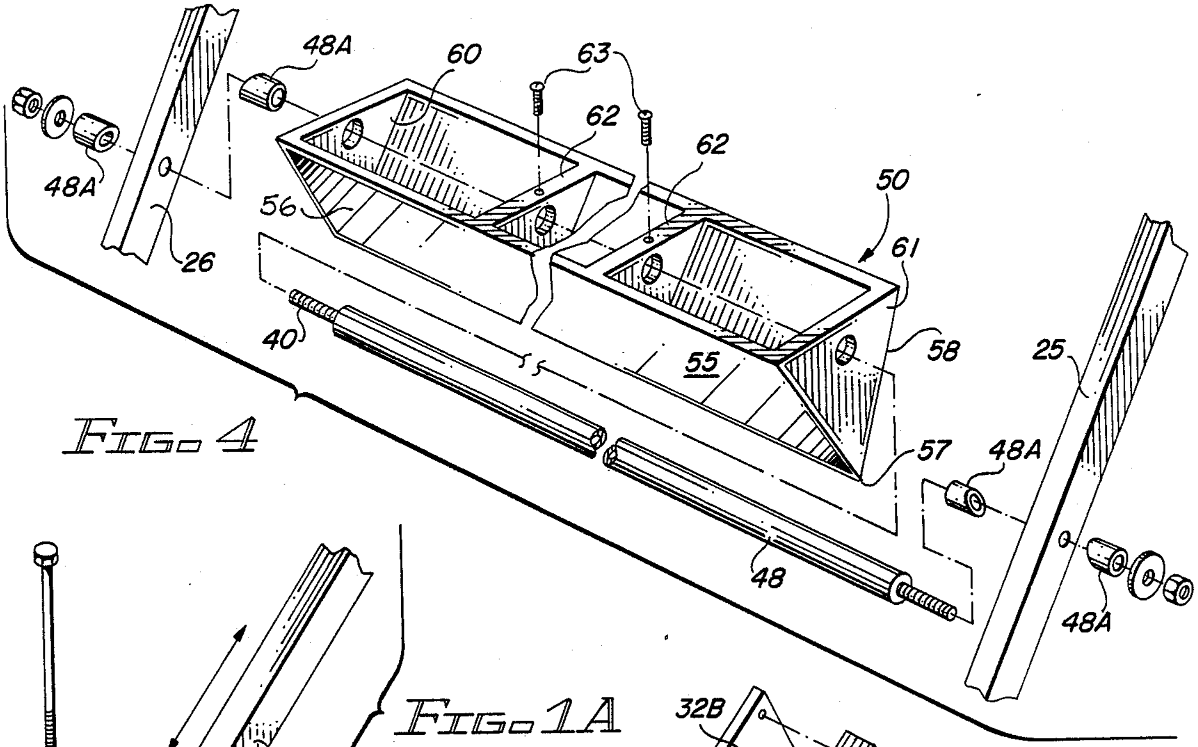
FIG. 4 is an exploded view of one of the horizontal reflector units.
Figure 4A:
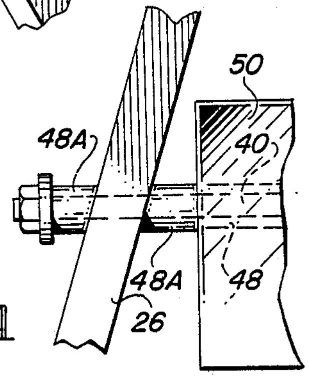
FIG. 4A is a detail view of the mounting arrangement of the horizontal reflectors.

FIG. 4 is typical of reflector units 50 to 55 showing the construction of reflector unit 50. The outer end of threaded rod 40 extends through the end mirror retainers 60 and 61 and through the frames 25 and 26 at their respective locations and are secured at their outer ends by suitable fastening and aligning means as shown in FIG. 4A. The tubes 48 have angled ends and the spacers 48A also have inner ends to provide the precise orientation for the angled inner ends to provide the precise orientation for the vertical mirror 70 located on the inside face of frame member 26 as shown in FIGS. 1 and 7.

Referring to FIGS. 1 & 4, the horizontal reflector assemblies 50, 51, 52, 53 and 54 are similarly constructed and viewed in cross section each has a generally inverted triangular shape with an open top having generally rectangular or trapezoidal shape. The opposite side walls 56 and 58 are oriented relative to one another at an angle of between 50° to 60° from horizontal with the preferred angle being 53 °. The lower edges of side walls 56 and 58 are spaced apart leaving a longitudinal slot 57 to allow precipitation to drain down and onto the skylight surface to remove dust, dirt and particulate material from the skylight dome.

As shown in FIG. 4, triangular-shaped end retainers 60 and 61 and one or more intermediate retainers 62 are secured to the horizontally extending tube 48 of the reflector assembly by set screws 63. Screws 63 are used to adjust the final position of the reflector assembly with respect to the horizon. The reflective side walls or side panels 56 and 58 are secured to the triangular shaped retainers 60, 61 and 62 by any conventional means such as by use of adhesive or mechanical fasteners. These triangular retainer members may be made of aluminum sheet, fiberglass sheet, monolithic plastic acrylic sheet, or monolithic or twin-wall polycarbonate sheet or any composite of the above in a molded or assembled configuration that is inherently protected from U.V. radiation and are fabricated having a thermal coefficient of expansion approximately equal to that of the reflecting panels to which they are attached. Reflecting side panels 56 and 58 are mirrorized with the surface applied in various ways such as polishing of a monolithic surface, deposition of reflective coatings through vacuum metalization or sputtering techniques or as a thinfilm laminate.

Referring to FIG. 1, the size and spacing of the horizontal and vertical reflector arrays will vary with the particular installation and size of the skylight 14 and the latitude on which the installation occurs. It will be observed by viewing FIGS. 1, 2 and 3 that substantial vertical openings exist between the vertically adjacent reflector sections. An open space also exists between the roof 18 and the bottom of the first tier of horizontal reflector assemblies 50 and 51. Similarly, a vertical opening exists between the first tier of reflector assemblies 50 and 51 and a second tier of reflector assemblies 52 and 53. A vertical space or opening exists between the second tier of reflector assemblies and the uppermost reflector assembly 54 mounted at the apex of the frame members. Frame member 25 is open, that is substantially free of obstructions, so that direct and diffused insolation is admitted through the southern end of the frame. Daylight is also admitted to the area within the frame through the openings or spaces between the individual reflector assemblies at all solar altitudes below 53°. This direct and diffuse isolation, daylight, is then redirected by the horizontal and vertical reflector assemblies downwardly through the skylight aperture and into the building cavity thereby enabling the installed system of day-lighting units to maintain sustained daylighting levels in the building interior not lower than that experienced by the daylighting system operating between 12° and 20° solar altitude.

Figure 3:
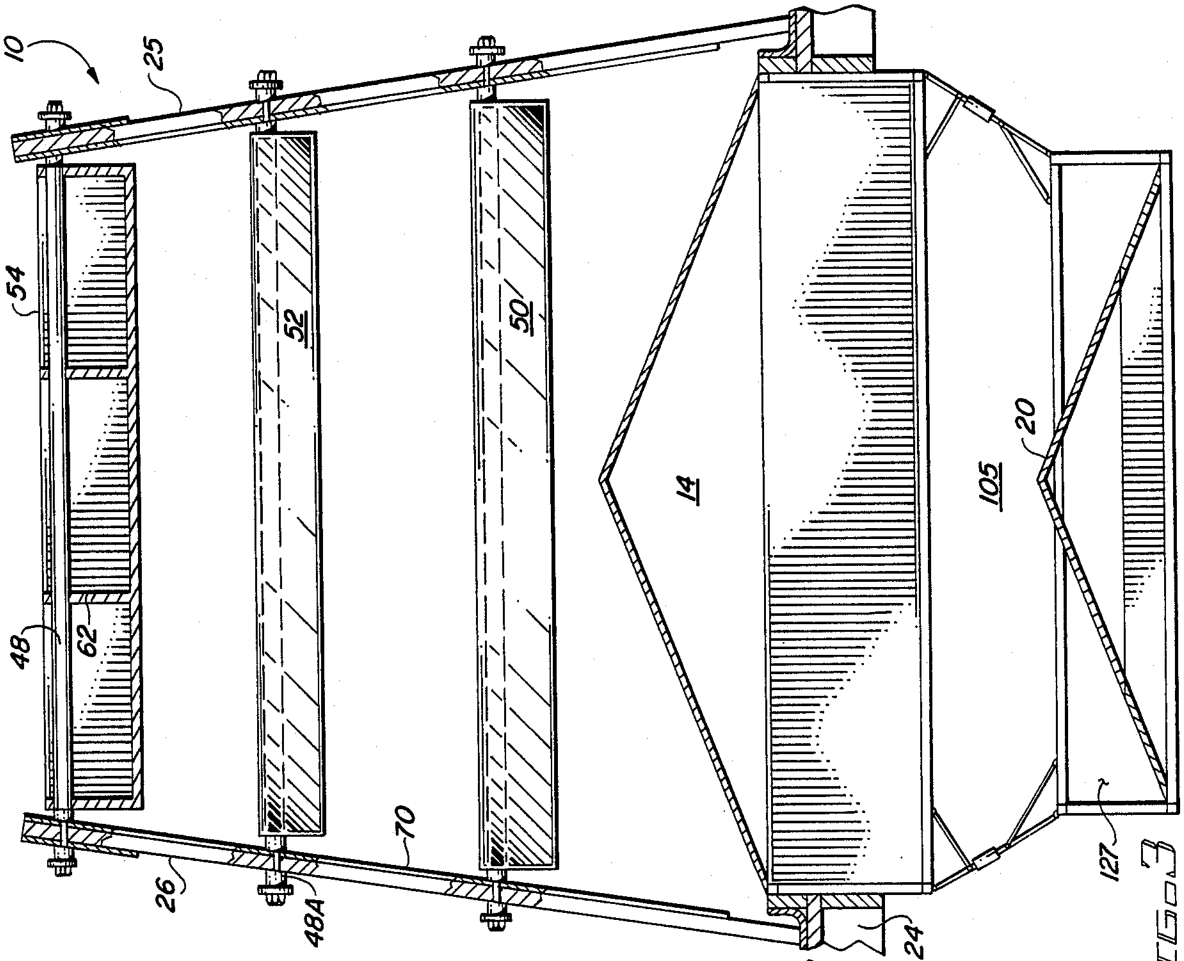
FIG. 3 is a side view of the daylighting apparatus.

The triangular-shaped vertical reflector 70, provided at the inner side of A-frame 26, is secured to this frame by fasteners and its mirrored surface is substantially of the same materials as the horizontal mirror assemblies 50 to 54 previously described. Frames 25 and 26 may be installed vertically over the skylight. However, as shown in FIG. 3, these A-frame components are preferably inclined inward and toward each other at their top most points from 6° to 10° from the absolute vertical position depending upon the latitude of the installation and the structural needs of the device.

Referring to FIG. 6, it will be seen that the horizontal reflective assemblies 50 to 54 cooperate to distribute daylight through reflection and beginning in the morning (ante meridian) by jointly reflecting solar insolation downward from an effective solar altitude of 12° (a.m.). Thereafter, the horizontal reflector assemblies direct daylight downward through a continuing effective zone of reflective operation spanning 39° to 41°. After this time, the horizontal reflector assemblies can no longer reflect insolation since solar altitude has reached 51° to 53° and parallels the sides of the reflector assemblies. At this point in the solar day the daylighting system begins to utilize the reflector assemblies as masks to prevent a certain portion of direct insolation from impacting the surface of the skylight dome below. This masking effect continues throughout the mid-solar and high-solar altitudes and increases in effectiveness until the solar meridian at which time the masking effect begins to diminish during the post-meridian (p.m.) period. During the (p.m.) period and when solar altitude reaches 51° to 53°, the mirrored panels of the reflector assemblies again begin to reflect direct solar insolation and continue their zone of operation spanning 39° to 41° solar altitude until solar altitude finally reaches 12° (p.m.). During the entire solar day direct insolation is never fully masked as insolation is always able to enter the open cavity formed by the A-frame members 28 and 30. It is noted direct and reflected insolation will impact and be redirected by the vertical mirror 70 toward the skylight aperture during all periods of the solar day, except when solar altitudes are higher than 83°. (See FIGS. 3 and 7) Vertical mirror 70 at the inner side of frame 26 operates at its most effective level in conjunction with the horizontal reflector assemblies before the occurrence of the vernal equinox (March 21/22) and after the occurrence of the autumnal equinox (September 21/22). It is to be further noted that the vertical reflector or mirror 70 is most effective in independent reflective capacity at solar noon on December 21/22 of the solar year.

Figure 2:
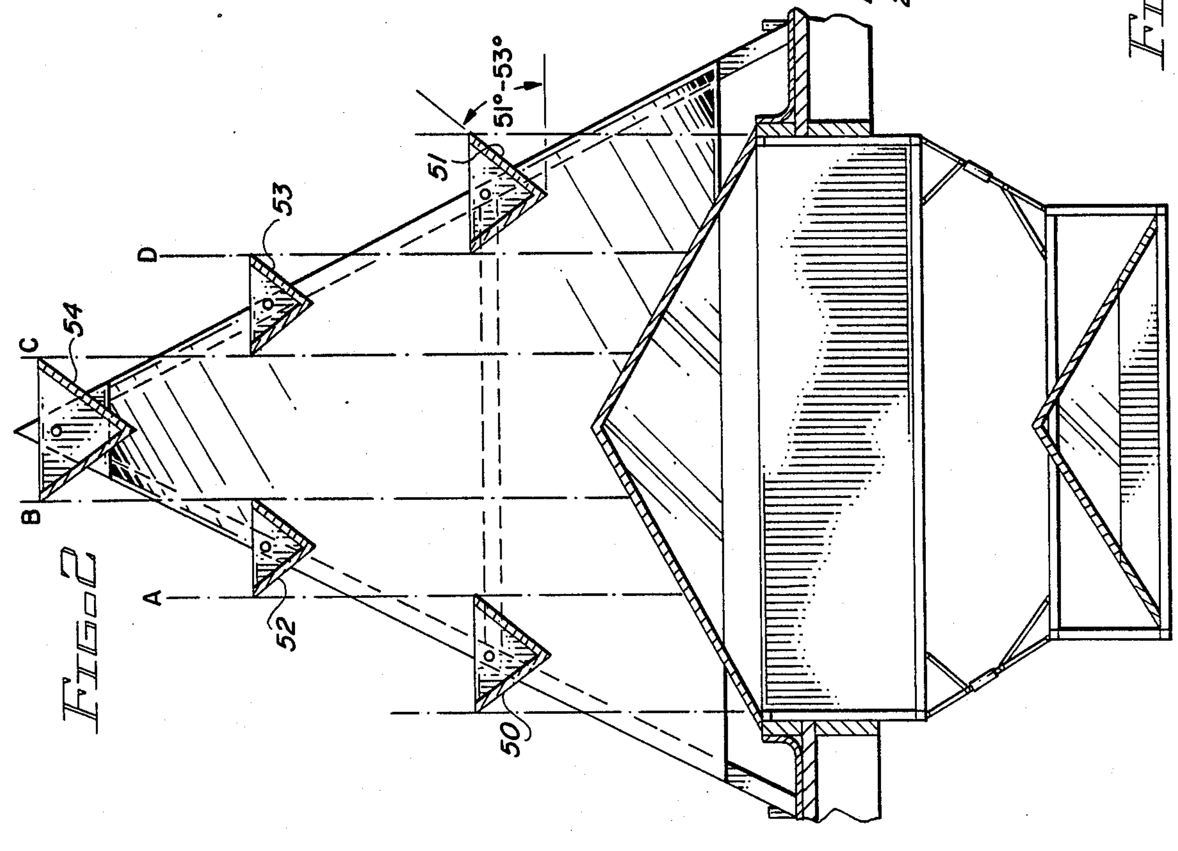
FIG. 2 is an end view of the daylighting apparatus of the present invention.

Referring to FIG. 2, vertical reference lines A-D have been drawn. These lines illustrate the relative position of each tier of reflectors with the edges of the horizontal reflectors being aligned as shown. No overlap occurs and adjacent tiers have a reflector edge tangentially intersecting the associated reference line. The purpose of this arrangement of horizontal mirror assemblies is to effectively block or mask direct insolation from impacting the skylight dome and light well during higher solar altitudes above 53° so that a substantial reduction in direct heat gain is realized. The system also uses the increased level of diffuse and ground reflected insolation occurring at these higher solar altitudes to maintain the minimum design illumination levels in the building cavity during the time the direct insolation is masked. The amount of direct insolation allowed onto the surface of the skylight can be increased or decreased by adjusting the telescopic legs of the A-frame, and by separating the horizontal reflector assemblies at their tangent points by repositioning the mirrors upward on the retainers. Adjusting these components either up or down has the net effect of raising the mirror arrays, either up or down, or allowing more daylight to pass more or less direct insolation to impact the skylight dome and thus giving some mechanical adjustment to the daylighting unit 10.

The overall effect of the present daylighting device is to cause the horizontal and vertical mirror arrays to direct reflected insolation during lower solar altitudes into the building cavity and thereby substantially increase the available daylight through-put to the interior while blocking or otherwise limiting the direct insolation from penetrating the interior area during higher solar altitudes.

The daylighting system also substantially increases the effectiveness and efficiency of conventional passive daylighting applications by permitting more precise and accurate adjustment at the time of installation.

The daylighting system is mounted and secured to a roof above an opening or aperture through which daylight is broadcast to a light well 16 and diffused by building lens system 20. This roof aperture is covered by a dome 14 which is preferably constructed from clear monolithic acrylic or polycarbonate and resistive to ultraviolet insolation. The skylight dome may be flat or bubble-shaped but is preferably pyramidal-shaped as is shown in FIGS. 2 and 3. The periphery of the dome is secured and sealed to the building by a dome retainer 72 which is preferably polyvinyl chloride, fiberglass or aluminum. This retainer 72 compresses the dome against a roof-framed curb 73 of wood, steel, fiber-through the roof 18 and to the frame members 24 by a plurality of fasteners and is sealed to the roof 18 using conventional roofing techniques and methods.

Light well 16 is of variable length depending upon the building construction and factors such as thickness of the roof members, distance of the finished ceiling from the roof and other aesthetic and architectural considerations. The light well includes an upper rectangular or square frame member 90, an intermediate section 105 and a lower rectangular or square building lens system 20 that is constructed from vertical and horizontal members 92, 94 and 95. The building cavity lens 20 is suspended from a plurality of wire cables 100 joined at their upper end to the upper frame member 90 which is permanently fastened to the structural roof members. Wire cables 100 and turnbuckles 102 form the generally vertical corners of the mid-section 105 of the light well assembly. The vertical interior walls 110 of mid-section 105 may be constructed from various materials including mirrorized acrylic panels, foil, painted sheetmetal, painted or laminated sheet rock, panelized or veneered plywood, polystyrene insulation board, polyester or nylon translucent or opaque canvas. The building lens daylighting distribution system 20 is positioned at the lower end of the light well 16.

The building lens system 20 may be variously configured to diffuse, reflect and absorb both direct and indirect insolation to the building cavity. The length, width, and depth of the light well 16 and the building lens system 20 will vary in size according to the design requirements of the end user of the building and cooperates to broadcast light into the building interior both vertically and horizontally.

Various lens configurations can be utilized in the lens system and a pyramidal lens having four triangular faces 126 and resting on a box-shaped frame 92 and 95 is shown. The pyramidal lens 126 is further encased within four vertical prismatic diffusion panels 127 which are retained by vertical frame members 94 and four horizontal frame members 92 and 95. It will be also noted that the pyramidal lens 126 has four trapezoid-shaped mirrorized reflecting panels 126A fastened around the lower edges to reflect daylight horizontally onto and through the four vertical diffusion panels 127. The size of panels 126A will vary according to the daylighting illumination level balance which is the ratio of illumination between the horizontal and vertical foot-candle levels transmitted to the building cavity and is proportionately determined by the mounting height of the entire lens assembly 20 above the interior room 22 work plane. The lens system 20 may be constructed from various materials including plastic sheets, acrylic or nylon fabric, glass, wood, aluminum or fiberglass secured to provide a rigid and integrated structural framework. The box-pyramid lens configuration 20 shown in FIG. 1 is typical for commercial and institutional installations such as supermarkets, department stores, school classrooms, government and business offices and would by nature vary in depth, length and width according to installation and design requirements.

FIG. 8 illustrates in schematic form a typical control arrangement in which sensors are located in the light well and within the building. An analog or digital microprocessor based artificial lighting controller (CPU) is incorporated with the daylighting system to turn the artificial lighting fixtures in the building on or off. This controller and its components are commercially available and known to those skilled in the art.

The particular design and engineering methods used to apply the invention to a building interior utilize the conventional light flux transfer theory and in particular an augmented form of the Illuminating Engineering Societies zonal cavity method of lighting design.

A significant advantage of the present invention is that the heat gain imposed by the sun is substantially reduced by using the invention. The infrared spectrum of the insolation produces a heat gain by impacting the building exterior and interior causing an increase in building interior temperatures. The infrared heat gain is commonly expressed graphically as a bell curve with its apex occurring in the later (p.m.) period of the solar day. This apex of heat gain curve occurs substantially after the higher solar altitudes and the time lag is thus due largely to the absorptance and resistance values of the building materials. Utility companies are concerned about the daily solar heat gain period due to the increased cooling load demand in summer months. This peak energy demand usually occurs between 3:30 pm and 7:30 pm and can result in substantially increased utility rates to utility customers during these peak periods of electrical energy demand. The present invention uses the much higher and naturally occurring efficiency ratio of daylighting (116 to 140 lumens-per-watt) to offset electrical energy consumption by turning off lower efficiency artificial lighting arrays (65 to 100 lumens-per-watt, i.e. fluorescent), in these facilities while continuing to supply a consistent level of illumination at or above the switched-off artificial lighting level during sunny or partly sunny days. This system is controlled by the artificial lighting controller which is calibrated to continually sense the available daylighting level in the building cavity and adjust the illumination level of the artificial lighting (primary lighting source) by switching it off, depending on illumination available from the daylighting (secondary lighting source). With the daylighting system of the present invention the artificial lighting system will be turned on or off in stages or banks or proportionately dimmed to correspond to the daily illumination level variance of the daylighting available. The synergetic combination of these two lighting systems serve to reduce the interior heat gain experienced with fluorescent or incandescent light sources prior to and during the peak heat gain periods without lowering the building interior illumination level requirements below the artificial lighting design thresholds. The highest peak electrical loads for climate controlled buildings usually occurs on the hottest days of the year in prolonged sunlight conditions. The present system will, when properly designed and installed, substantially reduce both the connected artificial lighting and the H.V.A.C. loads during these periods.

Verified Test

Drawing FIG. 5A is a chart of a verified test comparing the present invention to a conventional skylight daylighting device conducted at 38° north latitude on March 21st. Line A represents the performance of a conventional 48"×72" skylight mounted and sealed to a flat roof. Line B represents the performance of a daylighting system designed and constructed in accordance with FIGS. 1 to 4. Line B also represents the performance of the system mounted over the conventional skylight described above. The daylighting unit used for the above test contained an array of horizontal mirror assemblies having effective mirrorized reflector dimensions as follows: Elements 40 and 41 had (4) mirror panels each 8.5"×57". Elements 42 and 43 contained (4) mirror panels each 6"×55.25" in size. Element 44 contained (2) mirror panels each 11.5"×53.25". Vertical mirror assembly 70 was 60" at the base and 48" along each vertical side with a 12" wide top side. The total reflecting surfaces for the daylighting device was 52.11 square feet.

The horizontal axis of FIG. 5A represents solar time from 6:00 a.m. to the solar meridian or solar noon. This graph is used to depict the first half-day operation cycle so as to increase graph resolution whereas the second half-day operation cycle is the mirror image of the first half. The vertical axis represents the respective illumination levels experienced in a dedicated room that was 16 lineal feet cubed and in which the conventional skylight was mounted in the exact center of the roof.

The position of the light meter used to measure illumination levels was at the extreme southeast corner of the room and 12" from each wall and 12" above the floor. The weather conditions exhibited a clear and cloudless day.

Referring to the chart of FIG. 5A, the zone of luminous operation for each test was established to be between 80,000 and 85,000 lumens which is the minimum illumination threshold required for any daylighting device to function effectively to offset the artificial lighting illumination level in a building cavity. These tests were conducted every 30 minutes by first taking a light reading for the conventional skylight and then positioning the daylight system over the same skylight and reading the light meter. Curve B (daylighting unit) crosses the zone of operation at approximately 7:30 a.m. solar time. In comparison, curve A (conventional skylight) intersects this zone at 9:00 a.m. solar time or 1.5 hours later. Curve B shows the substantial effect of the increased reflective insolation entering the building cavity as a result of the horizontal reflector assemblies of the daylighting unit as in comparison with the unaided skylight during the same period. Further, referring to Curve B between 8:00 and 10:00 a.m., the lumen/footcandle curve becomes flat and does not rise above 118 footcandles at the light meter or 118,000 lumens at the daylighting device. This is a direct result of the partial blocking effect of the horizontal mirrors to the direct insolation impacting the skylight surface as the sun increases in altitude.

As the sun continues to gain altitude in the southern sky, the vertical mirror of the daylighting device begins to pick up and reflect insolation into the building cavity thereby causing Curves A and B to match and parallel one another until 10:30 a.m. at which time Curve B begins to drop sharply. This is where solar altitude has reached a point where the horizontal reflector assemblies can no longer reflect any insolation and the full masking effect begins. Curve B continues to drop sharply until it reaches its lowest point at the solar meridian, noon, whereupon this curve will increase during the p.m. operation. It is noted that Curve A, representing the performance of the unaided skylight, continues its upward path until solar noon is reached. It is thus demonstrated that the present system shapes and applies the daylight to the building cavity by adding reflected insolation during early morning hours when it is needed in the building interior and masks the higher, more intense insolation during mid-day when it is not needed and maintains even illumination levels with less heat gain to the building cavity than the conventional skylight of the same size.

Figure 5B:
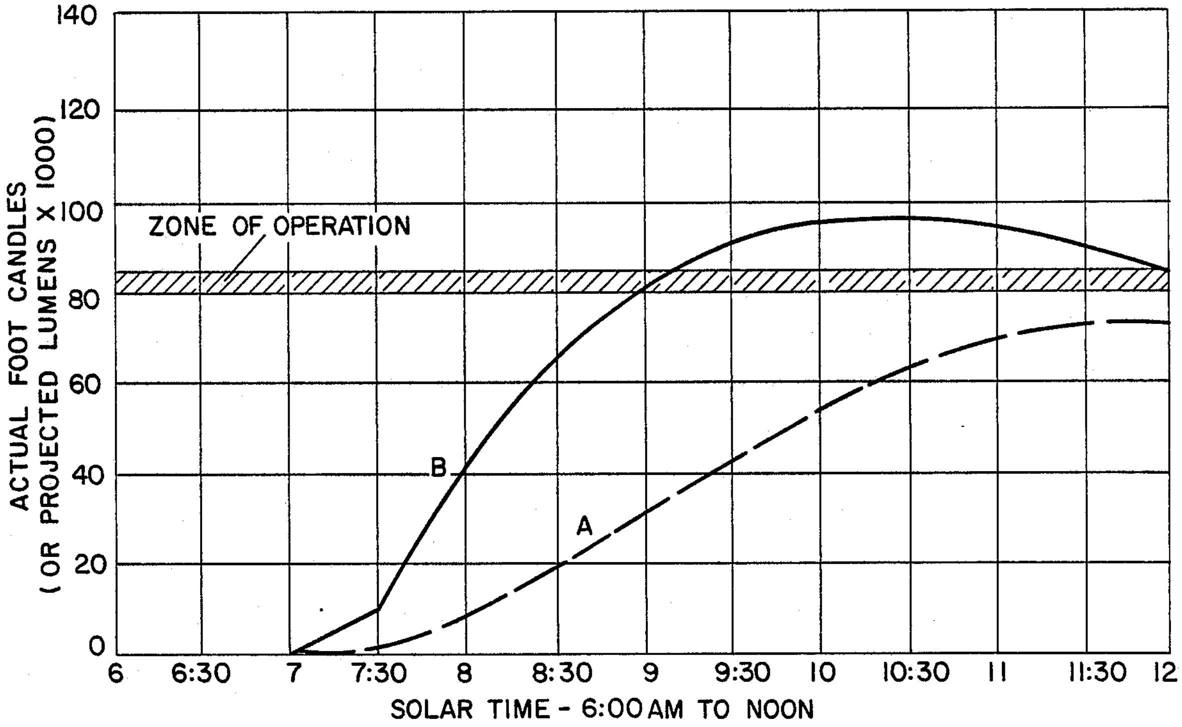

FIG. 5B is a chart similar to FIG. 5A which demonstrates the effectiveness of the daylighting unit in comparison with the conventional skylight at a north latitude of 38° in the month of December when the least sunlight is available. This figure also demonstrates that the present invention is approximately 2.75 times more effective in supplying interior daylight with less heat gain in the summer months than a comparable conventional skylight.

The daylighting system of the present invention is BTU neutral, meaning that it clamps its overlight condition in the building cavity to a peak of 170% of the minimum daylighting threshold required for interior illumination while providing a 100% artificial lighting off condition (offset) without exceeding the installed artificial lighting BTU output operating at the same illumination level. This neutral BTU condition is due to the greater efficiency of natural full-spectrum daylighting in comparison to conventional artificial lighting sources. It should be noted that the daylighting unit of the present invention has the equivalent lumen output of nine two-lamp fluorescent surface mounted strip lighting fixtures operating two Sylvania F96-T12-LWX/Super Saver 430 Ma. Slimline tubes and powered by a Universal watt-reducer ballast system. These electrical lighting fixtures require 123 watts each to operate and represent the most efficient fluorescent lighting source and fixture combination currently available to industry. This is the type of continuous strip fixture commonly found in large supermarkets and department stores throughout the nation.

In noting the performance of the conventional skylight, Curve A in FIG. 5B, it will be observed that the performance curve does not reach the minimum illumination threshold level. This is primarily because solar altitude never exceeds 32° and therefore cannot supply enough direct insolation for a conventional skylight to reach the required operational threshold. With the skylight of the invention, the operational threshold is reached at 9:00 am and is maintained even at the solar meridian. This increased operational performance is primarily due to the vertical reflector panel 70 which reflects insolation onto the skylight dome and into the building. The horizontal reflector arrays continue to operate up to about 5° (solar azimuth) before and after the solar meridian. This combination of mirror arrays reflecting insolation coupled with the direct insolation normally available to the conventional skylight provides the minimum requirement for effective daylighting throughout the shortest day of the solar year, December 21/22 (winter solstice). This minimum output criteria establishes the number of daylighting units required to offset at 100% the existing or proposed artificial lighting illumination thresholds.

EXAMPLE

The following is a comparative example of daylighting installations in a typical single story building containing a net daylight area of 18,750 square feet. The first system (System A) is a conventional skylight and the second system (System B) representing a system constructed according to the present invention. System B, the present invention, installed and operational, will offset the operating cost of an artificial lighting system delivering a maintained 80 footcandle level in the building cavity for six hours average on a sunny day in the month of December, using 30 daylighting units that individually illuminate 625 square feet each for a combined total roof penetration of 720 square feet. This represents a 3.84% area of penetration to the total net roof area of the building. The mean lumen level in the zone of operation for one daylighting device is 82,500 lumens which level is reached by System B throughout the entire net building area by 9:00 a.m. As a comparison System A, the conventional skylights, reaches only 30,000 lumens at the same time. System B exceeds the output of System A by 275%. Therefore, in order for System A to match the performance of System B, an increase of 30×275% or 83 conventional skylights would have to be installed for System A. If 53 additional skylights were added to the existing performance curve of System A in FIG. 5A, that would add 275% more lumens and 275% more heat gain to the building cavity than is shown. This simplified comparison quickly reveals that (140,000×275%) or 385,000 lumens for Curve A would far exceed the lumen requirement and excessive heat gain into the building cavity than System B, the present invention.

The following computer software model of an energy audit analysis of a proposed daylight installation further illustrates the effectiveness of the present invention. The items in the example are explained below.

SECTION A—PROPOSED DAYLIGHTING INSTALLATION

Items A(1) to A(4) are self-explanatory.

Item A(5) represents the total luminous output of one daylighting device at 3:40 p.m. on a clear day on December 21st, the shortest day of the year. This is the minimum primary sizing criteria base from which all daylighting arrays are designed.

Item A(6) is the efficiency factor of daylighting which has a mean of 128 lumens/watt of solar power. Therefore, this is the product of A5/128.

Item A(7) represents a single sun in the sky.

Items A(8)–A(10) determine the size and length of the light well below the skylight in the building cavity and are used in a specific formula designed by the Illuminating Engineering Society for the efficiency factor in A(13).

Items A(11)–A(14) are illumination reduction factors and their produce is also stated in Item A(15).

Item A(15) is the product of all factors from A(7) through A(14) and is stated as a net transmissivity factor to the building interior. Item A(15) is used in the IES zonal cavity method formulas for calculating the total number of fixtures/units required.

CLIENT FACILITY DATA

The eight items set forth in this section are the results of the client energy audit.

DESIGN RESULTS

This section includes information concerning the lighting installation. Its purpose is twofold:

(a) To demonstrate how natural daylighting can effectively displace a specific number of electrical lighting fixtures in an existing or planned environment with less heat gain and provide the equivalent amount of maintained daylighting illumination during daylight periods.

(b) To show the annualized cost of operating the existing electrical lighting system.

SECTION B—EXISTING ELECTRICAL LIGHTING INSTALLATION

This section corresponds to the above section for the electrical or proposed electrical lighting systems in the same area specified. This section compares major factors affecting the intended installation of a daylighting system.

INSTALLATION FEASIBILITY

Items C(1) through C(3) are self-explanatory. Item C(4) is derived from the astral equations used in the Ashare Handbook of Engineering Fundamentals. These formulae accurately determine the amount of available solar insolation falling on a horizontal window (skylight) at a given latitude in the northern hemisphere for each 30 minute interval of the day. This 12 month compilation of information constitutes the average results in the hours per day figure used in C(4).

Items C(5) through C(8) are self-explanatory.

Item C(9) is the direct result of the empirical testing of the present daylighting system. These tests have determined the threshold of the maximum average rise in illumination allowed by the daylighting unit and the resultant increase in KW/HR input into the building. The design masks the greater portion of the total insolation available during solar altitudes above 40 degrees. Therefore, the masking action limits the peak to 172% of the design threshold specified in section (A) "Design Results" in KW/HR.

To obtain C(11) subtract C(9) from C(6) then multiply the product by C(8) to determine the cooling load offset for the summer months in total KW/season. This amount is then added to C(7) to determine the net total in C(11) for the entire year.

If the facility is not space conditioned then the cooling load factor is removed from C(11) in the analysis. The cooling load offset in C(10) is expressed in KW/HR and represents the net portion of the connected H.V.A.C. load necessary to remove the remaining portion of the electrical lighting load heat gain that would be present if the daylighting system were not installed.

04/08/87

ENERGY AUDIT ANALYSIS
PREPARED BY
PYRMASOL DAYLIGHTING SYSTEMS

PREPARED FOR: COLLINE INDUSTRIES ADDRESS: HUTCHINSON, KS. TYPE OF FACILITY: MEDIUM INDUSTRIAL

SECTION (A): PROPOSED DAYLIGHTING INSTALLATION (1) FIXTURE TYPE: DAYLIGHTING
(2) MANUFACTURER: PYRMASOL
(3) CATALOG NO.: MODEL 2
(4) TYPE OF ILLUMINANCE: DAYLIGHTING FIXTURE #19 pg. 798
(5) LUMENS/TUBE OR UNIT: 101252 lu
(6) WATTS/TUBE OR UNIT: 791 wt
(7) NO. OF TUBES OR UNITS/FIXTURE: 1
(8) LIGHTWELL WIDTH: 3.854 lineal feet
(9) LIGHTWELL LENGTH: 5.791 lineal feet
(10) LIGHTWELL DEPTH: 1.5 lineal feet (subject to building req.)
(11) DOME DIRT DEPRECIATION FACTOR: .9 (wash ea. 6 mths.)
(12) DOME TRANSMISSIVITY FACTOR: .87
(13) LIGHTWELL EFFICIENCY (from ies FIG. 9): .95
(14) INTERIOR CAVITY LENS TRANSMISSIVITY FACTOR: .87
(15) NET DAYLIGHTING TRANSMISSIVITY FACTOR: .64715 (percentage remaining of A-5 above)

CLIENT FACILITY DATA

FACILITY NAME: MANUF. ASSY. (50-50-20)
MOUNTING HEIGHT OF FIXTURE (bottom to workplane): 20 lineal feet
LENGTH OF AREA: 250 lineal feet
WIDTH OF AREA: 75 lineal feet
FOOTCANDLES DESIRED: 80 ft.
ROOM CAVITY RATIO: 1
FIXTURE COEFFICIENT OF UTILIZATION: .75
TOTAL NET AREA ILLUMINATION: 18750 sq. ft.

DESIGN RESULTS

TOTAL AREA EACH FIXTURE/UNIT = 614.299 sq. ft.
TOTAL NO. OF FIXTURES/UNITS REQUIRED = 30
TOTAL DESIGNED LIGHTING LOAD = 15356.8695 va
TOTAL DESIGN AREA KW EACH HOUR = <<< 15.36 kw/h >>> (p.f. unity)
TOTAL FIXTURE/UNIT LUMENS IN AREA = 1,474,320 lu
TOTAL DESIGN AREA WATTS/SQ.FT. = .819033 wt
CALCULATED FOOTCANDLE DESIGN LEVEL = 78.6303 fc

SECTION (B): EXISTING ELECTRICAL LIGHTING INSTALLATION (1) FIXTURE TYPE: FLUORESCENT w/VWR ballast
(2) MANUFACTURER: ref. pg. 800
(3) CATALOG NO.: 25 porc. enamaled industrial
(4) TYPE OF ILLUMINANCE: SYLVANIA F96T12/LWX/85-430ma slimline ssl
(5) LUMENS TUBE OR UNIT: 5850 lu
(6) WATTS/TUBE OR UNIT: 61.5 wt
(7) NO. OF TUBES OR UNITS/FIXTURE: 1
(8) LAMP LUMEN DEPRECIATION FACTOR: .75 (12 hrs./start)
(9) LAMP DIRT DEPRECIATION FACTOR: .81 (ies category 1)
(10) BALLAST FACTOR LOSSES: .95
(11) TOTAL LIGHTING SYSTEM MAINTENANCE FACTOR: .577125 (percentage remaining of B-5 above)

CLIENT FACILITY DATA

FACILITY NAME: MANUF.ASSY,(50-50-20)
MOUNTING HEIGHT OF FIXTURE (bottom to workplane): 15 lineal feet
LENGTH OF AREA: 250 lineal feet
WIDTH OF AREA: 75 lineal feet
FOOTCANDLES DESIRED: 60 tc
ROOM CAVITY RATIO: 1
FIXTURE COEFFICIENT OF UTILIZATION: .75
TOTAL NET AREA OF ILLUMINATION: 18750 sq. ft.

DESIGN RESULTS

TOTAL AREA EACH FIXTURE UNIT = 68.6796 sq. ft.
TOTAL NO. OF FIXTURES/UNITS REQUIRED = 281
TOTAL DESIGNED LIGHTING LOAD = 34563 va
TOTAL DESIGN AREA KW EACH HOUR = <<< 34.56 kw/h >>> (p.f. unity)
TOTAL FIXTURE/UNIT LUMENS IN AREA = 1,498,960 lu
TOTAL DESIGN AREA WATTS/SQ.FT. = 1.84336 wt
CALCULATED FOOTCANDLE DESIGN LEVEL = 79,9444 fc

SECTION (C): INSTALLATION FEASABILITY (1) LATTITUDE OF INSTALLATION: 38 deg.
(2) PERCENTAGE OF SUNSHINE DAYS AT HUTCHINSON, KS. IS: 70
(ref. U.S. weather bureau statistics)
(3) TOTAL NO. OF SUNSHINE DAYS EACH YEAR: 255.5
(4) TOTAL AVERAGE NO. OF SUNSHINE HOURS EACH DAY HUTCHINSON, KS. IS: 8.33
(ref. [INISOL]program)
(5) TOTAL NO. OF DAYLIGHTING HOURS AVAILABLE EACH YEAR HUTCHINSON, KS. IS: 2128.315
(6) TOTAL CONNECTED ELECTRICAL LIGHTING LOAD IS: 34.56 kw/hr.
(ref. section B page one)
(7) TOTAL ELECTRIC LIGHTING LOAD OFFEST EACH YR. IS: <<< 73554 kw/yr >>>

-continued

04/08/87

ENERGY AUDIT ANALYSIS
PREPARED BY
PYRMASOL DAYLIGHTING SYSTEMS

PREPARED FOR: COLLINE INDUSTRIES    ADDRESS: HUTCHINSON, KS.    TYPE OF FACILITY: MEDIUM INDUSTRIAL (8) TOTAL COOLING LOAD HOURS OFFSET BY DAYLIGHTING IN SUMMER IS: 800 hrs.
(for summer cooling months of june, july & august only)
(9) AVERAGE DAILY REAL ILLUMINATION VARIANCE DOES NOT EXCEED: 26.4192 kw/hr.
(200.8 IS 17 of daylighting design threshold of 15.36 kw/hr.)
(10) TOTAL COOLIONG LOAD OFFSET BY DAYLIGHTING IS: 8.1408 kw/hr.
(0(6)-1(9) above)
(11) NET TOTAL KW/HOURS OFFSET EACH YEAR BY DAYLIGHTING FOR THE FACILITY HUTUNSON, KS IS: <<< 80067 KW/YR >>>

SECTION (D): INSTALLED SYSTEM RETAIL COST ESTIMATE (1) TOTAL ESTIMATED DETAILED COST OF DAYLIGHTING UNIT: $700.00
(2) TOTAL NO. OF DAYLIGHTING UNITS REQUIRED: 30
(ref. section A page one)
(3) TOAL ESTIMATED COST OF DAYLIGHTING SYSTEM INSTALLED (turnkey): $21,000.00
(ref. info from CLIENT ENERGY AUDIT DATA SHEET)

From the foregoing it will be seen that the present invention provides a highly effective and efficient daylighting system which achieves the objectives set forth in the specification.

It will be obvious to those skilled in the art that various modifications, changes and alterations can be made in the present invention to accommodate various installation criteria without departing from the spirit and scope of the appended claims. For example, the dimensions of the daylighting device and specific materials may depend greatly upon the particular installation and design considerations. Many factors will influence this such as desired illumination levels, location of the installation in terms of latitude, elevation of the installation, height of ceilings, electrical costs and the like. Nevertheless, as has been clearly demonstrated above, the present daylighting invention serves to best utilize the sun's light for all months of the year to achieve a balance between attaining adequate illumination levels and minimizing electrical energy costs. These various modifications, alterations and changes are intended to be clearly encompassed within the appended claims.

I claim:

1. A daylighting system for solar lighting a space having a roof with an opening therein for admission of light, said system comprising:

(a) a frame adapted to be positioned substantially above said opening;

(b) a plurality of generally horizontally extending reflectors on said frame having reflective surfaces adapted to redirect solar insolation to said opening at least during early and late periods in the solar day;

(c) shading means associated with said reflectors positioned to at least partially shade said opening from solar insolation during at least a portion of the mid solar day.

2. The system of claim 1 wherein said opening is a duct provided with a light admitting panel at the upper end of said duct.

3. The system of claim 1 wherein said reflectors are vertically spaced apart and adjustably positioned on said frame.

4. The system of claim 1 further including a substantially vertically extending reflector panel disposed adjacent said horizontal reflectors and adapted to re-direct solar insolation directly and indirectly toward said opening.

5. The system of claim 1 wherein said horizontal reflectors comprise a reflective surface generally arranged in a downwardly converging V-configuration.

6. The system of claim 2 wherein said duct is provided with light diffusing means at the lower end of said duct.

7. The system of claim 6 wherein said light diffusing means comprises an array of prismatic diffuse and reflective members.

8. The system of claim 5 wherein said reflectors are metallized plastic.

9. The system of claim 1 wherein said reflectors are generally V-shaped having downwardly converging reflective panels defining an angle therebetween of approximately 74° to 78°.

10. The system of claim 1 wherein said frame is an open A-frame having vertically adjustable legs.

11. The system of claim 1 wherein said horizontally extending reflectors comprise opposite reflective panels disposed in a V-shaped configuration with the reflective panels having upper and lower horizontal edges, each panel disposed at an angle of approximately 53° relative to the horizon.

12. The system of claim 11 wherein said horizontal reflectors are arranged in spaced-apart vertical tiers with the horizontal reflectors being in non-overlapping relationship when viewed from the top.

13. A daylighting system for solar lighting a space having a roof with a duct therein for admission of light, said system comprising:

(a) a first generally vertical frame member having leg members disposed in a general A configuration;

(b) a second frame member having leg members disposed in a general A configuration, said first and second frame members being spaced apart at opposite sides of said duct;

(c) a plurality of first reflector means extending horizontally between said frame member at vertically spaced apart location, said reflector each having a pair of reflective surfaces disposed in shaped configuration, said reflectors being relatively positioned to at least partially shade the duct during predetermined periods of the solar day;

(d) second reflective means extending between the leg members of said second frame member whereby said fist and second reflective means direct and redirect solar insolation toward said duct at least during predetermined periods of the solar day;

(e) a light admitting panel extending across the upper end of said duct;

(f) interior reflective surfaces at the inside of said duct; and (g) an interior light diffusing lens system at the lower end of said duct.

14. The system of claim 13 wherein said plurality of first reflectors include spacers extending between said reflective surface with tube means extending horizontally along said reflectors and being secured to said spacers and further including rod means extending within said tube, said rod means being secured at opposite ends to said first and second frame members.

15. The system of claim 14 wherein said first reflective means are arranged in generally horizontal tiers and wherein said first reflective members are horizontally and vertically adjustable.

16. The system of claim 14 wherein said interior light-diffusing lens system is suspended by adjustable cable means between the lower end of said duct.

17. The system of claim 14 wherein said frames are oriented in a N-S alignment with said second frame member being northern-most and wherein said second frame is disposed at an angle of 1° to 10° with respect to vertical.

18. The system of claim 14 further including sensor means to sense the available light in the lightwell duct and controller means operatively connected to said sensor and to electric lighting system within the area to selectively switch said electric lighting on or off in relation to amount of available solar illumination.

* * * * *